(12) United States Patent
Takahashi et al.

(10) Patent No.: US 9,143,261 B2
(45) Date of Patent: Sep. 22, 2015

(54) OPTICAL MODULE

(71) Applicant: Hitachi Metals, Ltd., Minato-ku, Tokyo (JP)

(72) Inventors: Ryuta Takahashi, Hitachi (JP); Hiroshi Ikuno, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/450,710

(22) Filed: Aug. 4, 2014

(65) Prior Publication Data

US 2015/0037038 A1  Feb. 5, 2015

(30) Foreign Application Priority Data

Aug. 5, 2013  (JP) .................................. 2013-162163

(51) Int. Cl.
| | |
|---|---|
| *H04B 10/00* | (2013.01) |
| *H04J 14/02* | (2006.01) |
| *H04B 10/40* | (2013.01) |
| *G02B 6/42* | (2006.01) |
| *H04B 10/50* | (2013.01) |

(52) U.S. Cl.
CPC . *H04J 14/02* (2013.01); *G02B 6/42* (2013.01); *H04B 10/40* (2013.01); *H04B 10/506* (2013.01)

(58) Field of Classification Search
CPC ........ H04B 10/50; H04B 10/501; G02B 6/42; G02B 6/4201; G02B 6/4204; G02B 6/4206; G02B 6/4214; G02B 6/4215
See application file for complete search history.

(56) References Cited

U.S. PATENT DOCUMENTS

| | | | | |
|---|---|---|---|---|
| 2003/0020913 | A1* | 1/2003 | Richard et al. ................ | 356/399 |
| 2005/0180755 | A1* | 8/2005 | Masahiko ...................... | 398/135 |
| 2006/0210219 | A1* | 9/2006 | Takahashi et al. ............. | 385/24 |
| 2009/0052898 | A1* | 2/2009 | Oki et al. ........................ | 398/79 |
| 2012/0189306 | A1* | 7/2012 | Du et al. ......................... | 398/65 |
| 2013/0028611 | A1* | 1/2013 | Amit .............................. | 398/152 |
| 2014/0294386 | A1* | 10/2014 | Shinada et al. ................ | 398/65 |
| 2014/0321856 | A1* | 10/2014 | Saeki et al. ..................... | 398/79 |

FOREIGN PATENT DOCUMENTS

| | | |
|---|---|---|
| JP | 2007-279507 A | 10/2007 |
| JP | 2008-203427 A | 9/2008 |

* cited by examiner

*Primary Examiner* — Daniel Dobson
(74) *Attorney, Agent, or Firm* — Crowell & Moring LLP

(57) ABSTRACT

An optical transceiver includes: a first WDM filter which reflects a first optical signal from a first light source and passes a second optical signal from a second light source; a first total reflection mirror which reflects the first optical signal to make it enter the first WDM filter; a second total reflection mirror which reflects the second optical signal; and a second WDM filter which reflects the second optical signal reflected by the second total reflection mirror to make it enter the first WDM filter. The first and second WDM filters are disposed on a light path, the first and second light sources are disposed back and forth along the light path on both sides thereof, the first and second total reflection mirrors are disposed outside the light path, and an incident angle of the first optical signal to the first WDM filter is smaller than 45 degrees.

6 Claims, 6 Drawing Sheets

OPTICAL MODULE

CROSS-REFERENCE TO RELATED APPLICATION

The present application claims priority from Japanese Patent Application No. 2013-162163 filed on Aug. 5, 2013, the content of which is hereby incorporated by reference into this application.

TECHNICAL FIELD OF THE INVENTION

The present invention relates to an optical module, in particular, to a WDM (Wavelength Division Multiplexing) optical module.

BACKGROUND OF THE INVENTION

Various types of WDM optical modules have been developed, and a WDM optical transceiver is one of them. For example, a WDM optical transceiver provided with a TOSA (Transmitter Optical Sub-Assembly) which multiplexes a plurality of optical signals emitted from a plurality of light sources and having different wavelengths has been developed. Japanese Patent Application Laid-Open Publication No. 2007-279507 (Patent Document 1) and Japanese Patent Application Laid-Open Publication No. 2008-203427 (Patent Document 2) describe an optical transceiver provided with a TOSA in which four semiconductor lasers (LD: Laser Diode) having different oscillation wavelengths are disposed in a row.

SUMMARY OF THE INVENTION

In recent years, further downsizing of WDM optical modules including an optical transceiver has been desired. For example, a downsized optical transceiver compliant with QSFP+ (Quad Small Form-factor Pluggable Plus) which is a transceiver standard of an optical fiber compatible with 40 to 100 GbE (Gigabit Ethernet) connection has been desired.

The downsizing of the TOSA is necessary for the downsizing of an optical module provided with the TOSA, and the improvement in the arrangement of component parts of the TOSA including light sources is necessary for the downsizing of the TOSA.

However, when determining the arrangement of component parts of the TOSA, it is not possible to simply pursue the downsizing only. For example, the component parts of the WDM optical module including the optical transceiver include a wavelength selective filter (WDM filter) in many cases. Here, from the viewpoint of the wavelength selection capability of the WDM filter, a light incident angle to the WDM filter (angle formed by normal line of incidence plane and optical axis) is desired to be as small as possible, and 0 degree is most desirable. This is because the wavelength selection capability of a general WDM filter tends to be degraded as the light incident angle to the WDM filter increases, and the number of optical thin films constituting the WDM filter needs to be increased for avoiding the degradation in the wavelength selection capability of the WDM filter due to the increase of the incident angle. More specifically, the number of film formations in the manufacturing process of the WDM filter needs to be increased, and it leads to the increase in manufacturing cost and the reduction in manufacturing yield. Therefore, when the component parts of the optical module include the WDM filter, the arrangement of various component parts needs to be improved while taking into consideration the light incident angle to the WDM filter.

An object of the present invention is to achieve the further downsizing of an optical module.

An optical module of the present invention is an optical module which multiplexes a plurality of optical signals emitted from a plurality of light sources and having different wavelengths and outputs a multiplexed optical signal, and the optical module includes: a first optical component which reflects a first optical signal emitted from a first light source and passes at least a second optical signal emitted from a second light source; a second optical component which reflects the first optical signal emitted from the first light source to make it enter the first optical component; a third optical component which reflects the second optical signal emitted from the second light source; and a fourth optical component which reflects the second optical signal reflected by the third optical component to make it enter the first optical component. The first optical component and the fourth optical component are disposed on the same light path, the first light source and the second light source are disposed back and forth along the light path on both sides of the light path, the second optical component and the third optical component are disposed outside the light path, and an incident angle of the first optical signal to the first optical component is smaller than 45 degrees.

In one aspect of the present invention, the second optical component is opposed to the first light source across the light path and reflects the first optical signal emitted from the first light source diagonally backward with respect to a traveling direction of an optical signal in the light path to make it enter the first optical component. Also, the third optical component is opposed to the second light source across the light path and reflects the second optical signal emitted from the second light source diagonally backward with respect to the traveling direction of the optical signal in the light path to make it enter the fourth optical component.

In another aspect of the present invention, a third light source which emits a third optical signal having a wavelength different from those of the first optical signal and the second optical signal is provided. In this aspect, the fourth optical component reflects the second optical signal and passes at least the third optical signal. The first optical component reflects the first optical signal and passes at least the second optical signal and the third optical signal. The first light source, the second light source and the third light source are disposed alternately along the light path on both sides of the light path, and an incident angle of the second optical signal to the fourth optical component is smaller than 45 degrees.

In another aspect of the present invention, a fourth light source which emits a fourth optical signal having a wavelength different from those of the first optical signal, the second optical signal and the third optical signal and a fifth optical component which reflects the third optical signal and passes at least the fourth optical signal are provided. In this aspect, the fourth optical component reflects the second optical signal and passes at least the third optical signal and the fourth optical signal. The first optical component reflects the first optical signal and passes at least the second optical signal, the third optical signal and the fourth optical signal. The first light source, the second light source, the third light source and the fourth light source are disposed alternately along the light path on both sides of the light path, and an incident angle of the third optical signal to the fifth optical component is smaller than 45 degrees.

In another aspect of the present invention, a sixth optical component which is opposed to the third light source and reflects the third optical signal emitted from the third light source diagonally backward with respect to the traveling direction of the optical signal in the light path to make it enter the fifth optical component, a seventh optical component which is opposed to the fourth light source and reflects the fourth optical signal emitted from the fourth light source diagonally backward with respect to the traveling direction of the optical signal in the light path, and an eighth optical component which reflects the fourth optical signal reflected by the seventh optical component in a direction parallel to the traveling direction of the optical signal in the light path to make it enter the fifth optical component are provided.

In another aspect of the present invention, the first optical component, the fourth optical component and the fifth optical component are wavelength selective filters, and the second optical component, the third optical component, the sixth optical component, the seventh optical component and the eighth optical component are total reflection mirrors.

According to the present invention, it is possible to achieve the further downsizing of an optical module.

BRIEF DESCRIPTIONS OF THE DRAWINGS

DESCRIPTIONS OF THE PREFERRED EMBODIMENTS

Hereinafter, an example of an optical module to which the present invention is applied will be described in detail with reference to accompanying drawings. The optical module described below is a WDM optical transceiver compliant with QSFP+ standard, and it has an external appearance shown in FIG. 1 and FIG. 2.

Figure 1:
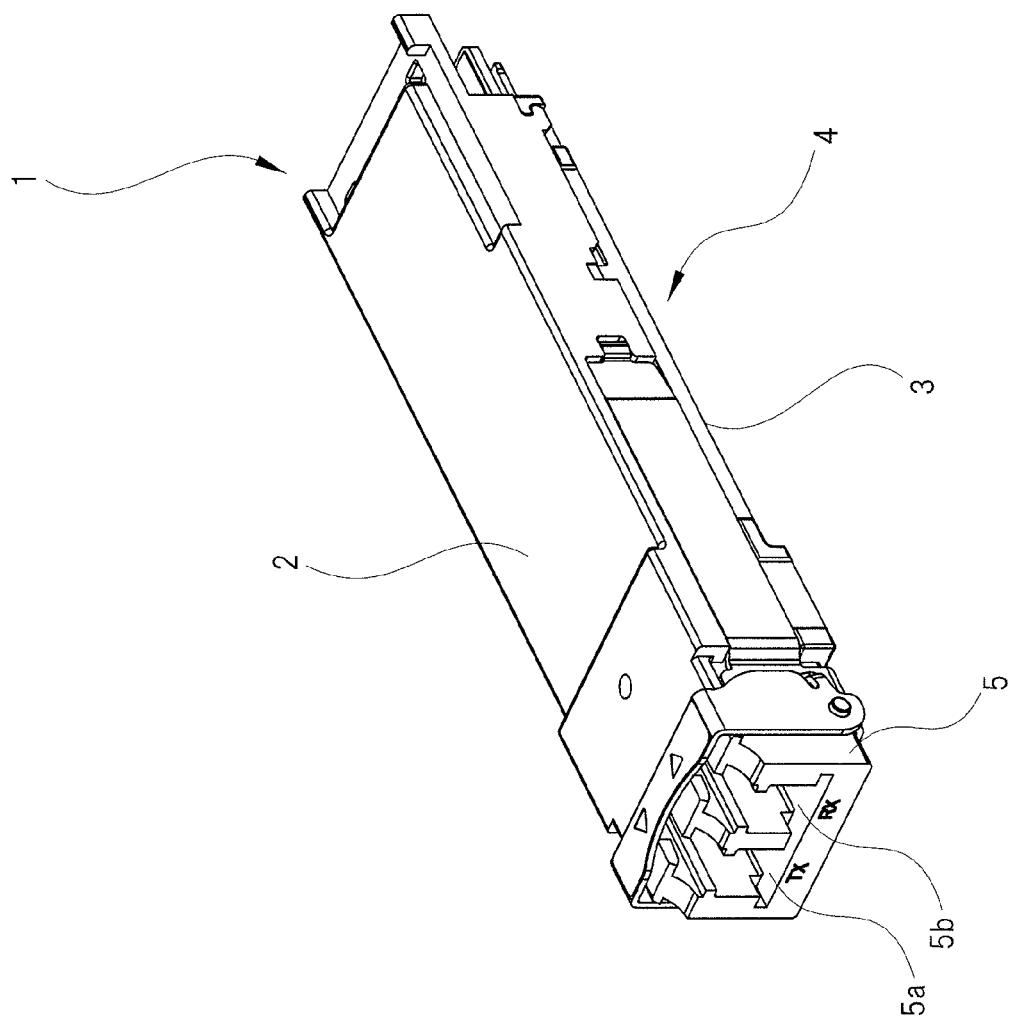
FIG. 1 is a perspective view of an optical transceiver to which the present invention is applied.
Figure 2:
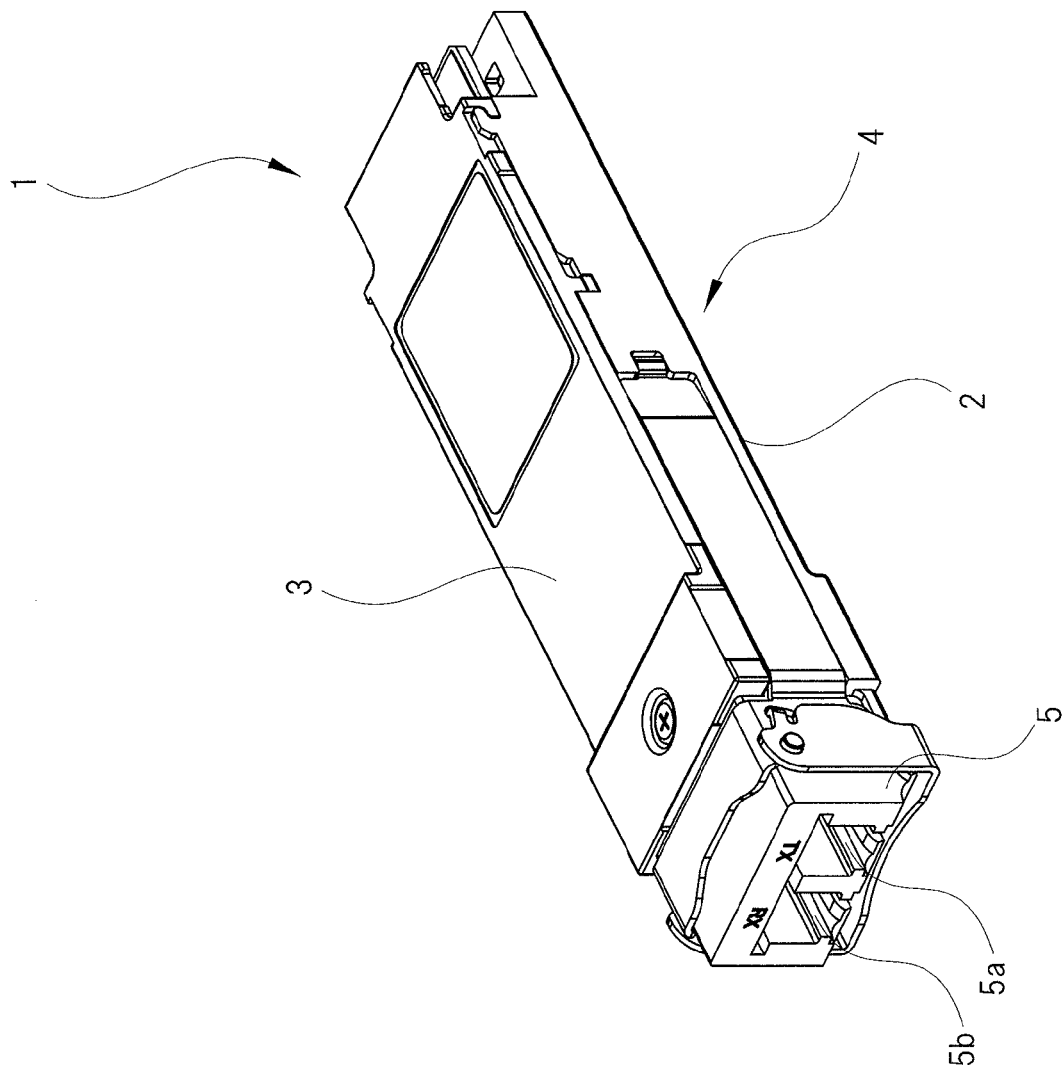
FIG. 2 is another perspective view of the optical transceiver shown in FIG. 1.
Figure 3:
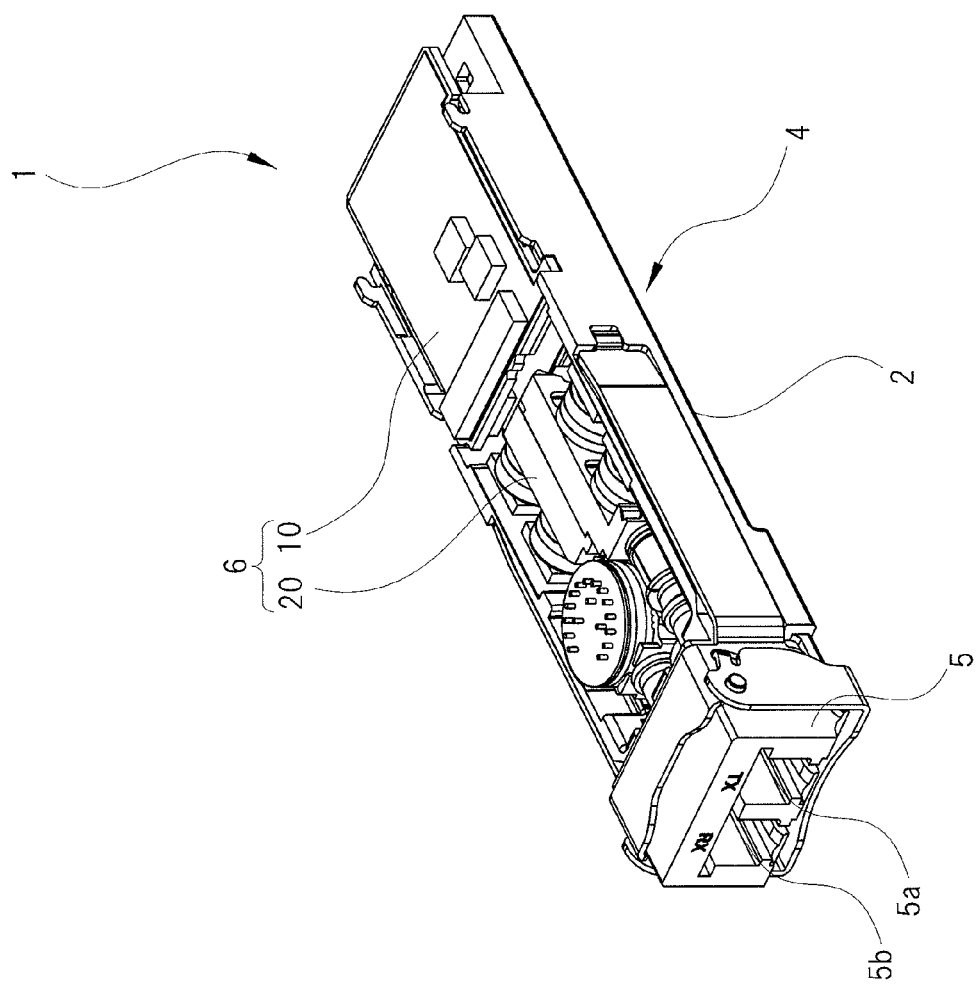
FIG. 3 is a perspective view of the optical transceiver of FIG. 1 from which a lower case has been removed.

As shown in FIG. 1 and FIG. 2, an optical transceiver 1 has a chassis 4 made up of an upper case 2 and a lower case 3 and an optical adaptor 5 provided at one longitudinal end of the chassis 4. Also, as shown in FIG. 3, an optical transmitter-receiver assembly 6 is housed inside the chassis 4. In the following description, of the both longitudinal ends of the chassis 4, one side on which the optical adaptor 5 is provided is referred to as "front side" and the side opposite to the front side is referred to as "rear side" in some cases. More specifically, the optical adaptor 5 is provided on the front side of the chassis 4.

The chassis 4 shown in FIG. 1 and FIG. 2 has a size compliant with QSFP+ standard. Also, the optical adaptor 5 has two insertion ports 5a and 5b to which an optical connector attached to one end of optical fiber is inserted. One insertion port 5a is a transmitter port (TX) and the other insertion port 5b is a receiver port (RX).

As shown in FIG. 3, the optical transmitter-receiver assembly 6 has a circuit board 10 and a transmitter unit 20. The optical transmitter-receiver assembly 6 is housed inside the chassis 4 so that the circuit board 10 is disposed on the rear side of the chassis 4 and the transmitter unit 20 is disposed on the front side of the chassis 4.

Figure 4:
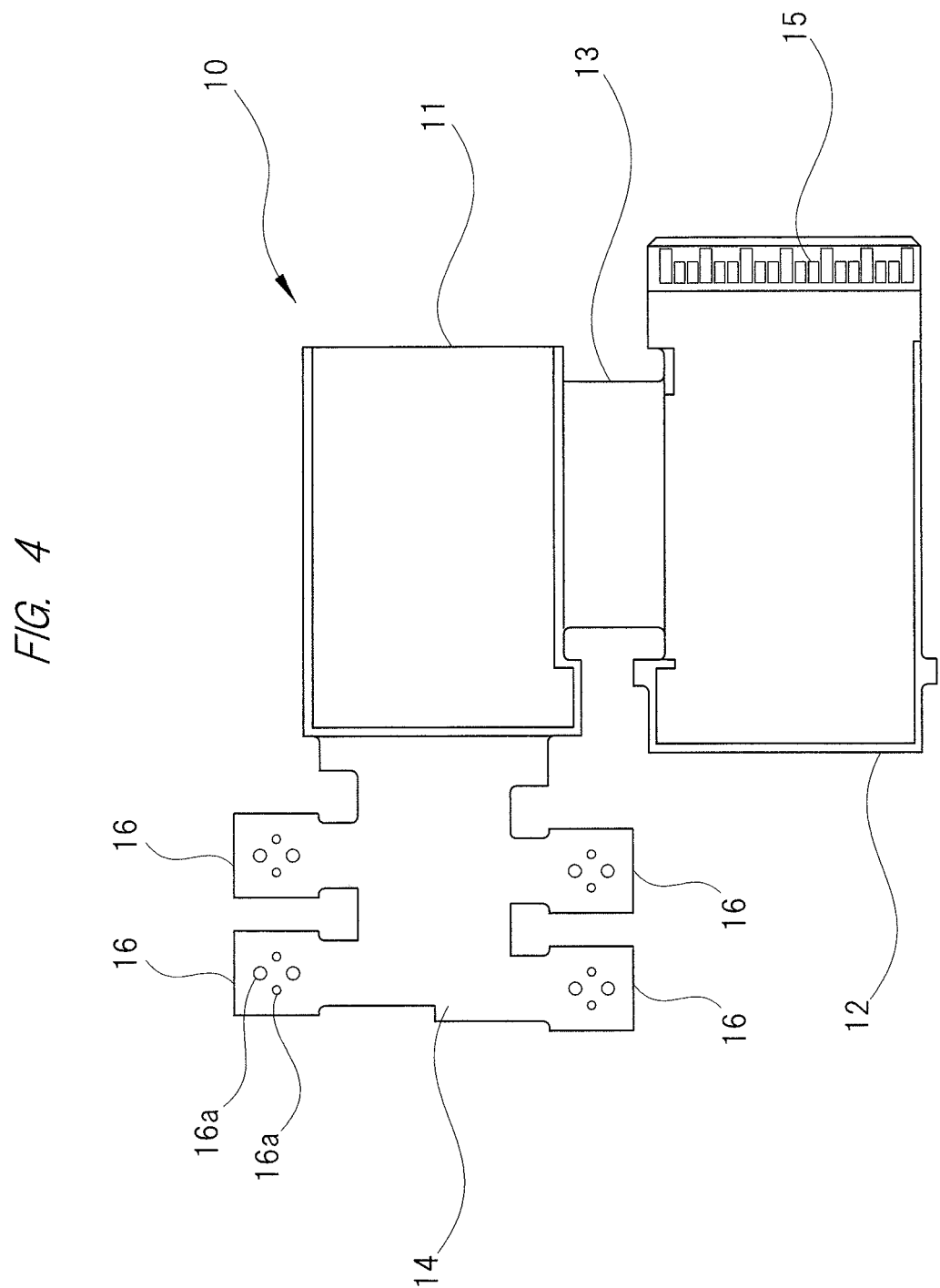
FIG. 4 is a development view of a circuit board constituting an optical transmitter-receiver assembly.

As shown in FIG. 4, the circuit board 10 has an upper rigid substrate 11, a lower rigid substrate 12, a connecting flexible substrate 13 which connects these substrates, and an upper flexible substrate 14 extending from the upper rigid substrate 11. Although illustration thereof is omitted, a plurality of parts for transmission are mounted on the upper rigid substrate 11, and these parts are connected by a printed wiring depending on needs. Similarly, a plurality of parts for reception are mounted on the lower rigid substrate 12, and these parts are connected by a printed wiring depending on needs. Further, an edge connector 15 is formed along one side of the lower rigid substrate 12. Though not shown in FIG. 3, the upper rigid substrate 11 shown in FIG. 4 is electrically connected to the transmitter unit 20 shown in FIG. 3 through the upper flexible substrate 14 shown in FIG. 4.

Figure 5:
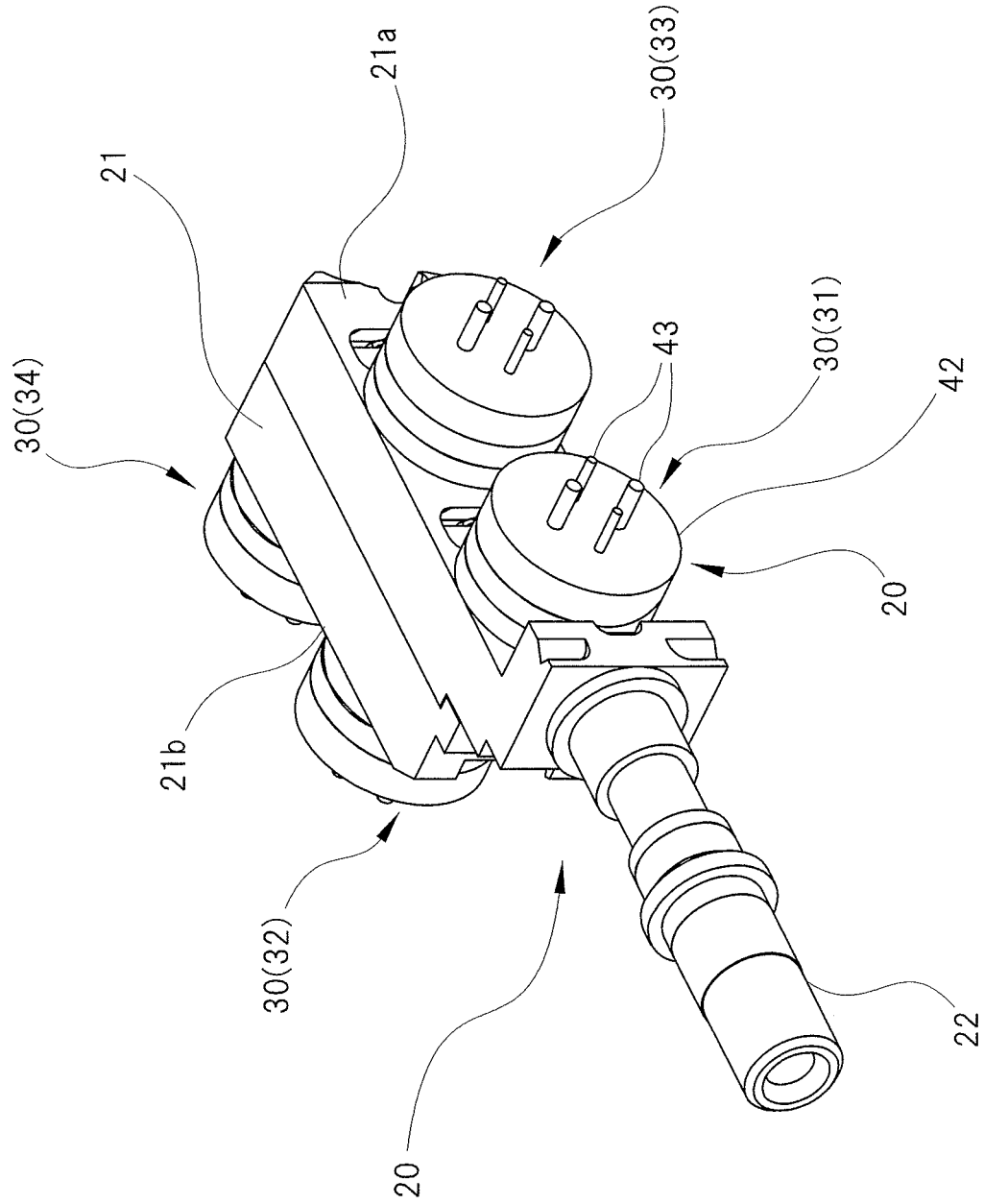
FIG. 5 is a perspective view of a transmitter unit constituting the optical transmitter-receiver assembly.

As shown in FIG. 5, the transmitter unit 20 has a base 21 and light sources 30, each two of which are provided on both side surfaces of the base 21, and a sleeve 22 extends from one end surface of the base 21. Specifically, a first light source 31 and a third light source 33 are provided on one side surface of the base 21, and a second light source 32 and a fourth light source 34 are provided on the other side surface of the base 21. In the following description, when it is not particularly necessary to distinguish the first light source 31, the second light source 32, the third light source 33 and the fourth light source 34, these light sources are collectively referred to as "light source 30".

Figure 6:
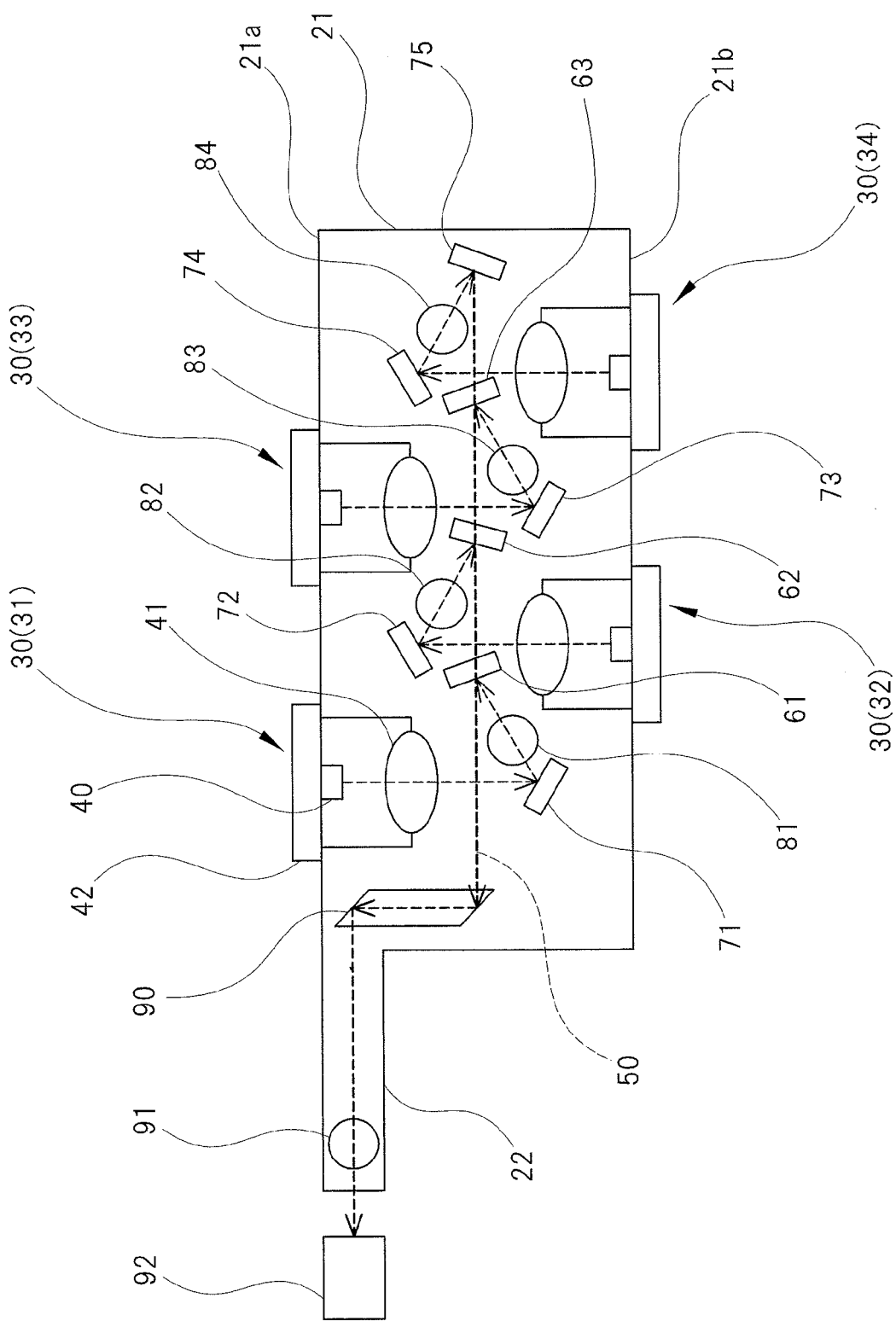
FIG. 6 is a schematic view showing a configuration of the transmitter unit shown in FIG. 5.

As shown in FIG. 6, in each of the light sources 30, a semiconductor laser (LD) 40 and a lens 41 for condensing laser light as an optical signal output from the semiconductor laser 40 are integrated in the state of being mounted in a metal package 42. More specifically, each of the light sources 30 is a CAN-packaged semiconductor laser.

With reference to FIG. 5 again, four lead pins 43 protrude from a back surface of the package of each of the light sources 30. On the other hand, as shown in FIG. 4, four joint parts 16 corresponding to each of the light sources 30 (FIG. 5) are formed in the upper flexible substrate 14, and connection holes 16a in which the lead pins 43 (FIG. 5) of the corresponding light source 30 are inserted are formed in each of the joint parts 16. Each joint part 16 shown in FIG. 4 is bent about 90 degrees and is jointed to the back surface of the package of each light source 30 shown in FIG. 5.

Here, the first light source 31, the second light source 32, the third light source 33 and the fourth light source 34 shown in FIG. have respectively different oscillation wavelengths. More specifically, these light sources 30 emit optical signals each having different wavelengths in accordance with the electric signal output from the circuit board 10 shown in FIG. 3. Specifically, an optical signal with a wavelength of 1331 nm (hereinafter, "first optical signal") is emitted from the first light source 31. Similarly, an optical signal with a wavelength of 1271 nm (hereinafter, "second optical signal") is emitted from the second light source 32, an optical signal with a wavelength of 1311 nm (hereinafter, "third optical signal") is emitted from the third light source 33, and an optical signal with a wavelength of 1291 nm (hereinafter, "fourth optical signal") is emitted from the fourth light source 34. Also, in order to couple and multiplex a plurality of optical signals emitted from the respective light sources 30, a plurality of optical components are disposed in the base 21. Respective optical components will be described concretely below. In the following description, when it is not particularly necessary to distinguish the first optical signal, the second optical signal, the third optical signal and the fourth optical signal, these optical signals are collectively referred to as "optical signal".

As shown in FIG. 6, the first light source 31 and the third light source 33 are disposed on a first side surface 21a of the base 21, and the second light source 32 and the fourth light source 34 are disposed on a second side surface 21b opposite to the first side surface 21a. The optical signal is emitted from the first light source 31 and the third light source 33 toward the second side surface 21b, and the optical signal is emitted from the second light source 32 and the fourth light source 34 toward the first side surface 21a. More specifically, the emission direction of the optical signal from the first light source 31 and the third light source 33 and the emission direction of the optical signal from the second light source 32 and the fourth light source 34 are deviated from each other by 180 degrees.

Between the first and third light sources 31 and 33 and the second and fourth light sources 32 and 34, a light path 50 parallel to the side surfaces 21a and 21b is set, and a wavelength selective filter 61 serving as a first optical component, a wavelength selective filter 62 serving as a fourth optical component and a wavelength selective filter 63 serving as a fifth optical component are disposed on the light path 50. Also, a total reflection mirror 71 serving as a second optical component, a total reflection mirror 72 serving as a third optical component, a total reflection mirror 73 serving as a sixth optical component, a total reflection mirror 74 serving as a seventh optical component and a total reflection mirror 75 serving as an eighth optical component are disposed outside the light path 50.

Furthermore, the wavelength selective filter 61, the wavelength selective filter 62 and the wavelength selective filter 63 are disposed in this order on the light path 50 in a row. More specifically, the wavelength selective filters 61, 62 and 63 are disposed on the same light path. Also, the total reflection mirror 71 is opposed to the first light source 31 across the light path 50. Similarly, the total reflection mirror 72 is opposed to the second light source 32 across the light path 50, the total reflection mirror 73 is opposed to the third light source 33 across the light path 50, and the total reflection mirror 74 is opposed to the fourth light source 34 across the light path 50. More specifically, the total reflection mirrors 71, 72, 73 and 74 are disposed outside the light path on which the wavelength selective filters 61, 62 and 63 are disposed.

As shown in FIG. 6, the first optical signal (wavelength of 1331 nm) emitted from the first light source 31 enters the total reflection mirror 71. The first optical signal which has entered the total reflection mirror 71 is reflected by the total reflection mirror 71, collimated by a collimator lens 81, and then enters the wavelength selective filter 61 (hereinafter, "WDM filter 61"). More specifically, the total reflection mirror 71 reflects the first optical signal emitted from the first light source 31 toward the WDM filter 61 to make it enter the WDM filter 61. The WDM filter 61 which the first optical signal enters has a wavelength selectivity with which the light with a wavelength of 1331 nm is reflected and the light with a wavelength other than that is passed. Therefore, the first optical signal which has entered the WDM filter 61 is reflected by the WDM filter 61 and travels from a right side to a left side of the sheet of FIG. 6 along the light path 50.

From the description above and FIG. 6, it can be understood that the total reflection mirror 71 reflects the first optical signal emitted from the first light source 31 diagonally backward with respect to the traveling direction of the first optical signal reflected by the WDM filter 61. More specifically, the total reflection mirror 71 reflects the first optical signal diagonally backward with respect to the traveling direction of the optical signal on the light path 50.

Furthermore, the arrangement (tilt) of the total reflection mirror 71 is set so that an incident angle (θ1) of the first optical signal reflected by the total reflection mirror 71 to the WDM filter 61 becomes smaller than 45 degrees (15 degrees in this embodiment). Here, the incident angle (θ1) of the first optical signal to the WDM filter 61 means the angle formed by the optical axis of the first optical signal and the normal line of the WDM filter 61.

The second optical signal (wavelength of 1271 nm) emitted from the second light source 32 enters the total reflection mirror 72. The second optical signal which has entered the total reflection mirror 72 is reflected by the total reflection mirror 72, collimated by a collimator lens 82, and then enters the wavelength selective filter (hereinafter, "WDM filter 62"). More specifically, the total reflection mirror 72 reflects the second optical signal emitted from the second light source 32 toward the WDM filter 62 to make it enter the WDM filter 62. The WDM filter 62 which the second optical signal enters has a wavelength selectivity with which the light with a wavelength of 1271 nm is reflected and the light with a wavelength other than that is passed. In other words, the WDM filter 62 reflects the second optical signal and passes optical signals other than that. Therefore, the second optical signal which has entered the WDM filter 62 is reflected by the WDM filter 62, travels from a right side to a left side of the sheet of FIG. 6 along the light path 50, and enters the WDM filter 61.

From the description above and FIG. 6, it can be understood that the total reflection mirror 72 reflects the second optical signal emitted from the second light source 32 diagonally backward with respect to the traveling direction of the second optical signal reflected by the WDM filter 62. More specifically, the total reflection mirror 72 reflects the second optical signal diagonally backward with respect to the traveling direction of the optical signal on the light path 50.

Furthermore, the arrangement (tilt) of the total reflection mirror 72 is set so that an incident angle (θ2) of the second optical signal reflected by the total reflection mirror 72 to the WDM filter 62 becomes smaller than 45 degrees (15 degrees in this embodiment). Here, the incident angle (θ2) of the second optical signal to the WDM filter 62 means the angle formed by the optical axis of the second optical signal and the normal line of the WDM filter 62.

The third optical signal (wavelength of 1311 nm) emitted from the third light source 33 enters the total reflection mirror 73. The third optical signal which has entered the total reflection mirror 73 is reflected by the total reflection mirror 73, collimated by a collimator lens 83, and then enters the wavelength selective filter (hereinafter, "WDM filter 63"). More specifically, the total reflection mirror 73 reflects the third optical signal emitted from the third light source 33 toward the WDM filter 63 to make it enter the WDM filter 63. The WDM filter 63 which the third optical signal enters has a wavelength selectivity with which the light with a wavelength of 1311 nm is reflected and the light with a wavelength other than that is passed. In other words, the WDM filter 63 reflects the third optical signal and passes optical signals other than that. Therefore, the third optical signal which has entered the WDM filter 63 is reflected by the WDM filter 63 and travels from a right side to a left side of the sheet of FIG. 6 along the light path 50, and enters the WDM filter 62. Furthermore, the third optical signal which has entered the WDM filter 62 is passed through the WDM filter 62 and enters the WDM filter 61.

From the description above and FIG. 6, it can be understood that the total reflection mirror 73 reflects the third optical signal emitted from the third light source 33 diagonally backward with respect to the traveling direction of the third optical signal reflected by the WDM filter 63. More specifically, the total reflection mirror 73 reflects the third optical signal diagonally backward with respect to the traveling direction of the optical signal on the light path 50.

Furthermore, the arrangement (tilt) of the total reflection mirror 73 is set so that an incident angle (θ3) of the third optical signal reflected by the total reflection mirror 73 to the WDM filter 63 becomes smaller than 45 degrees (15 degrees in this embodiment). Here, the incident angle (θ3) of the third optical signal to the WDM filter 63 means the angle formed by the optical axis of the third optical signal and the normal line of the WDM filter 63.

The fourth optical signal (wavelength of 1291 nm) emitted from the fourth light source 34 enters the total reflection mirror 74. The fourth optical signal which has entered the total reflection mirror 74 is reflected by the total reflection mirror 74, collimated by a collimator lens 84, and then enters the total reflection mirror 75. The fourth optical signal which has entered the total reflection mirror 75 is reflected by the total reflection mirror 75, travels from a right side to a left side of the sheet of FIG. 6 along the light path 50, and enters the WDM filter 63. The fourth optical signal which has entered the WDM filter 63 is sequentially passed through the WDM filter 63 and the WDM filter 62 and enters the WDM filter 61.

As described above, the first optical signal is reflected by the total reflection mirror 71 and enters the WDM filter 61. The second optical signal is sequentially reflected by the total reflection mirror 72 and the WDM filter 62 and enters the WDM filter 61. The third optical signal is sequentially reflected by the total reflection mirror 73 and the WDM filter 63, is then passed through the WDM filter 62, and enters the WDM filter 61. The fourth optical signal is sequentially reflected by the total reflection mirrors 74 and 75, is then sequentially passed through the WDM filters 63 and 62, and enters the WDM filter 61. More specifically, the first to fourth optical signals finally enter the same WDM filter 61. Here, as described above, the WDM filter 61 reflects the first optical signal and passes optical signals other than that. Therefore, the first optical signal which has entered the WDM filter 61 is reflected by the WDM filter 61 and enters a prism 90. Also, the second to fourth optical signals which have entered the WDM filter 61 are passed through the WDM filter 61 and enter the prism 90. More specifically, the first to fourth optical signals are coupled and multiplexed. In other words, an optical signal obtained by the wavelength multiplexing of the first to fourth optical signals enters the prism 90.

The multiplexed optical signal which has entered the prism 90 changes its traveling direction, and is directed to a condenser lens 91 disposed at an end of the sleeve 22. The multiplexed optical signal directed to the condenser lens 91 is output to outside through the condenser lens 91 and enters an optical fiber (not shown) connected to an optical connector 92 inserted into the insertion port 5a (FIG. 1). In other words, the condenser lens 91 condenses the multiplexed optical signal at an end surface of the optical fiber connected to the insertion port 5a (FIG. 1).

As shown in FIG. 6, the light sources 30 are disposed on both sides of the light path 50. Therefore, compared with the case where the light sources 30 are disposed in a row on one side of the light path 50, the size (total length) of the base 21 in the direction parallel to the light path 50 is reduced. Also, the light sources 30 are disposed back and forth along the light path 50. Therefore, compared with the case where two light sources 30 are disposed to be opposed to each other (right opposite to each other), the size (width) of the base 21 in the direction orthogonal to the light path 50 is reduced. Furthermore, since three or more light sources 30 are disposed alternately along the light path 50, the total length and the width of the base 21 are further reduced.

In addition, the incident angle (θ1) of the first optical signal to the WDM filter 61, the incident angle (θ2) of the second optical signal to the WDM filter 62 and the incident angle (θ3) of the third optical signal to the WDM filter 63 are smaller than 45 degrees. Therefore, it is possible to use relatively inexpensive WDM filters. In other words, when it is desired to obtain an equivalent wavelength selectivity in the case where an incident angle of an optical signal to a WDM filter is 45 degrees or larger, expensive WDM filters in which more optical thin films are stacked need to be used. As a whole, in the optical transceiver 1 of the present embodiment, further downsizing can be achieved while avoiding the increase in manufacturing cost.

The present invention is not limited to the foregoing embodiment and various modifications and alterations can be made within the scope of the present invention. For example, the optical module of the above-described embodiment is provided with four light sources. However, the number of light sources is not particularly limited, and a wavelength-multiplexed optical signal can be output as long as two or more light sources are provided. For example, if the third light source 33, the fourth light source 34, the total reflection mirrors 73, 74 and 75, and the collimator lenses 83 and 84 shown in FIG. 6 are omitted and the WDM filter 62 is replaced with a total reflection mirror, an optical transceiver which outputs an optical signal obtained by the wavelength multiplexing of the first optical signal and the second optical signal can be obtained. Also, if the fourth light source 34, the total reflection mirrors 74 and 75 and the collimator lens 84 shown in FIG. 6 are omitted and the WDM filter 63 is replaced with a total reflection mirror, an optical transceiver which outputs an optical signal obtained by the wavelength multiplexing of the first optical signal, the second optical signal and the third optical signal can be obtained.

Oscillation wavelengths of the respective light sources (wavelengths of respective optical signals) in the above-described embodiment are just one example, and they can be set arbitrarily. Also, the WDM filters in the above-described embodiment can be replaced with other WDM filters having a wavelength selectivity in accordance with the wavelengths of the optical signals emitted from the respective light sources.

What is claimed is:

1. An optical module which multiplexes a plurality of optical signals emitted from a plurality of light sources and having different wavelengths and outputs a multiplexed optical signal, the optical module comprising:

a first optical component which reflects a first optical signal emitted from a first light source and passes at least a second optical signal emitted from a second light source;

a second optical component which reflects the first optical signal emitted from the first light source to make it enter the first optical component;

a third optical component which reflects the second optical signal emitted from the second light source; and a fourth optical component which reflects the second optical signal reflected by the third optical component to make it enter the first optical component, wherein the first optical component and the fourth optical component are disposed on the same light path, the first light source and the second light source are disposed back and forth along the light path on both sides of the light path, the second optical component and the third optical component are disposed outside the light path, and an incident angle of the first optical signal to the first optical component is smaller than 45 degrees.

2. The optical module according to claim 1,
wherein the second optical component is opposed to the first light source across the light path and reflects the first optical signal emitted from the first light source diagonally backward with respect to a traveling direction of an optical signal in the light path to make it enter the first optical component, and the third optical component is opposed to the second light source across the light path and reflects the second optical signal emitted from the second light source diagonally backward with respect to the traveling direction of the optical signal in the light path to make it enter the fourth optical component.

3. The optical module according to claim 1, further comprising:
a third light source which emits a third optical signal having a wavelength different from those of the first optical signal and the second optical signal, wherein the fourth optical component reflects the second optical signal and passes at least the third optical signal, the first optical component reflects the first optical signal and passes at least the second optical signal and the third optical signal, the first light source, the second light source and the third light source are disposed alternately along the light path on both sides of the light path, and an incident angle of the second optical signal to the fourth optical component is smaller than 45 degrees.

4. The optical module according to claim 3, further comprising:
a fourth light source which emits a fourth optical signal having a wavelength different from those of the first optical signal, the second optical signal and the third optical signal; and a fifth optical component which reflects the third optical signal and passes at least the fourth optical signal, wherein the fourth optical component reflects the second optical signal and passes at least the third optical signal and the fourth optical signal, the first optical component reflects the first optical signal and passes at least the second optical signal, the third optical signal and the fourth optical signal, the first light source, the second light source, the third light source and the fourth light source are disposed alternately along the light path on both sides of the light path, and an incident angle of the third optical signal to the fifth optical component is smaller than 45 degrees.

5. The optical module according to claim 4, further comprising:
a sixth optical component which is opposed to the third light source and reflects the third optical signal emitted from the third light source diagonally backward with respect to the traveling direction of the optical signal in the light path to make it enter the fifth optical component;

a seventh optical component which is opposed to the fourth light source and reflects the fourth optical signal emitted from the fourth light source diagonally backward with respect to the traveling direction of the optical signal in the light path; and an eighth optical component which reflects the fourth optical signal reflected by the seventh optical component in a direction parallel to the traveling direction of the optical signal in the light path to make it enter the fifth optical component.

6. The optical module according to claim 5,
wherein the first optical component, the fourth optical component and the fifth optical component are wavelength selective filters, and the second optical component, the third optical component, the sixth optical component, the seventh optical component and the eighth optical component are total reflection mirrors.

* * * * *